Patented Nov. 27, 1923.

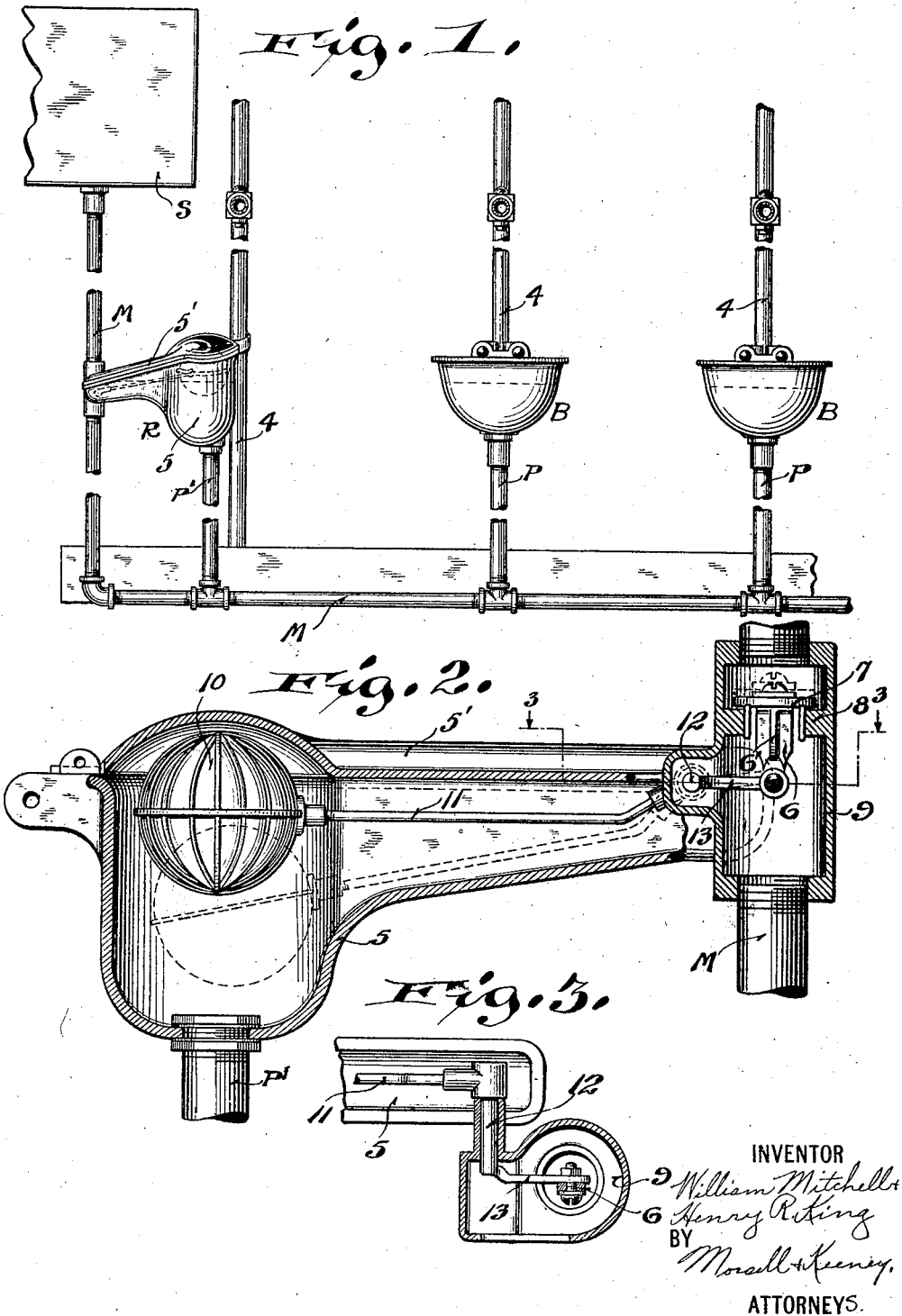

1,475,403

UNITED STATES PATENT OFFICE.

WILLIAM MITCHELL AND HENRY R. KING, OF MILWAUKEE, WISCONSIN, ASSIGNORS TO MITCHELL MANUFACTURING COMPANY, OF MILWAUKEE, WISCONSIN, A CORPORATION OF WISCONSIN.

STOCK-WATERING SYSTEM.

Application filed October 8, 1919. Serial No. 329,293.

*To all whom it may concern:*

Be it known that we, WILLIAM MITCHELL and HENRY R. KING, citizens of the United States, and residents of Milwaukee, in the county of Milwaukee and State of Wisconsin, have invented new and useful Improvements in Stock-Watering Systems, of which the following is a description, reference being had to the accompanying drawings, which are a part of this specification.

This invention relates to stock watering systems.

Heretofore it has been customary in stock watering systems for charging a plurality of water bowls to conduct the water from the storage tank through a regulator and thence to the bowls. We have found in these prior constructions that the conducting of the water through the regulator decreases the velocity of the water flowing to the drinking bowls and also the effective pressure. To remedy this difficulty we have provided a system in which the water is conducted direct from the storage tank to the bowls and in which the regulator is shunted off from the main supply line and serves to control the supply of water to the bowls and regulate the height of the water therein whereby we obtain all the advantages of pressure and velocity of the water coming from the storage tank and are able to fill the bowls quickly.

The invention further consists in a novel form of regulator for controlling the supply of water to the bowls.

With the above and other objects in view which will appear as the description proceeds, our invention resides in the novel construction, combination and arrangement of parts substantially as hereinafter described and more particularly defined by the appended claims, it being understood that such changes in the precise embodiment of the hereindisclosed invention may be made as come within the scope of the claim.

In the accompanying drawing we have illustrated one complete example of the physical embodiment of our invention constructed according to the best mode we have so far devised for the practical application of the principles thereof:—

In the drawings: Fig. 1 is a view of the system embodying the invention, parts being broken away;

Fig. 2 is a vertical section through the regulator;

Fig. 3 is a section taken on the line 3—3 of Fig. 2.

Referring to Fig. 1 of the drawings, the letter S represents the storage tank, M the main supply pipe, R the regulator attached to one of the stall uprights 4, B the drinking bowls, shown attached to stall uprights 4, P the risers or pipes leading from the pipe M to the bowls B, and P', the riser or pipe leading from the pipe M to the regulator R.

The regulator R controlling the passage of water to the bowls B consists of a bowl or tank 5 to the bottom of which the pipe P' is connected, a cover 5', and a float controlled valve in the supply pipe M.

The valve consists of a member 6 carrying a head 7 adapted to seat upon an annular flange 8 extending inwardly from the sides of a coupling 9 in the pipe M, said coupling forming a pipe connection in the main supply pipe. The valve member 6 is provided with flanges 6' forming grooves between them to permit greater discharge of water through the opening formed by the flange 8.

The float controlled means for operating the valve consists of a hollow ball float 10 disposed in the tank 5 and connected to a rod 11, and a connection between said rod and the valve member 6. This connection consists of a shaft 12 journalled in the coupling 9 and connected to the rod 11 and carrying a crank 13 pivotally secured to the lower end of the valve member 6. The weight of the float keeps the valve normally open.

The tank 5 of the regulator is disposed at substantially the same level as that of the water bowls B so that the water from the supply pipe will flow upwardly through the riser to the bowls B and to the tank 5 and the level of the water in the tank 5 will be the same as that in the bowls B.

With this construction, the water from the pressure supply flows through the main M up the risers P and P' into the bowls B and the tank 5 of the regulator to the same level and when the water reaches a predetermined height it raises the float 10 which through the connections previously described closes the valve in the supply pipe M and on a decrease in the level of the water in any one or more of the bowls the water in the tank 5 is lowered thus lowering the float and the valve is lifted off of its seat to again allow water to pass from the main to the bowls and to the regulator.

From the foregoing description it will be apparent that the water is delivered directly from the supply to the bowls thus insuring a constant supply of water thereto and that the regulator controls the passage of water from the supply pipe to the bowls and is not in the main supply line.

What we claim as our invention is:

In the stock-watering system the combination with a source of supply, a supply pipe leading therefrom, and a water bowl connected with said supply pipe at a level beneath that of said source of supply of means for maintaining water in said bowl at a substantially constant level, comprising a float chamber arranged exteriorly of said pipe and source of supply on a plane substantially level with said water bowls; a coupling member connecting said chamber with said supply pipe; a valve seat within said coupling member; a valve within said coupling normally engaging said seat to shut off the supply of water from the said bowl a float member positioned within said chamber; and a connection between said float member and valve whereby upon a fall of the water level in the bowl and float chamber said valve will be disengaged from its seat and upon the water reaching the desired level said valve will be re-engaged with the seat.

In testimony whereof, we affix our signatures.

WILLIAM MITCHELL.
HENRY R. KING.